(12) United States Patent
Yamano

(10) Patent No.: US 7,768,725 B2
(45) Date of Patent: Aug. 3, 2010

(54) LENS BARREL

(75) Inventor: Tohru Yamano, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 63 days.

(21) Appl. No.: 11/902,275

(22) Filed: Sep. 20, 2007

(65) Prior Publication Data

US 2008/0074759 A1 Mar. 27, 2008

(30) Foreign Application Priority Data

Sep. 21, 2006 (JP) ................... 2006-255363

(51) Int. Cl.
*G02B 7/02* (2006.01)
(52) U.S. Cl. ...................................... 359/823
(58) Field of Classification Search ............... 359/819, 359/821, 822, 823, 826, 829, 811, 813, 817
See application file for complete search history.

(56) References Cited

U.S. PATENT DOCUMENTS

| | | | |
|---|---|---|---|
| 4,748,466 A * | 5/1988 | Yamada et al. ................ 396/73 |
| 4,972,214 A * | 11/1990 | Shibayama et al. ......... 396/408 |
| 6,081,391 A * | 6/2000 | Nishio et al. ................ 359/700 |
| 6,449,430 B1 * | 9/2002 | Tasaka et al. .................. 396/6 |
| 6,701,084 B2 * | 3/2004 | Onda et al. ................. 396/538 |
| 6,707,993 B1 * | 3/2004 | Mitani et al. .................. 396/72 |
| 6,819,500 B2 * | 11/2004 | Tsuzuki ....................... 359/696 |
| 6,870,691 B2 * | 3/2005 | Konno ......................... 359/738 |
| 2006/0018654 A1 | 1/2006 | Nuno et al. |
| 2006/0203357 A1 * | 9/2006 | Irisawa ....................... 359/696 |
| 2006/0209192 A1 | 9/2006 | Shinohara et al. |

FOREIGN PATENT DOCUMENTS

| JP | 2565022 | 8/1993 |
|---|---|---|
| JP | 3795484 | 7/2005 |
| JP | 2005-308843 | 11/2005 |
| JP | 2006-079070 | 3/2006 |

* cited by examiner

*Primary Examiner*—Scott J Sugarman
*Assistant Examiner*—Vipin M Patel
(74) *Attorney, Agent, or Firm*—Dickstein Shapiro LLP

(57) ABSTRACT

A light shielding piece is supported by a second lens holding frame such that the light shielding piece can rotate and move on a plane which is perpendicular to an optical axis. In a shooting state, a through hole formed in the second lens holding frame is closed to establish a light shielding state. In a retracted state, on the other hand, a first auxiliary shaft passing through a through hole of the second lens holding frame pushes the light shielding piece to generate a component force. The generated component force rotates and moves the light shielding piece on a plane which is perpendicular to the optical axis, and the lens barrel is brought into an opened state where the through hole is not blocked.

11 Claims, 7 Drawing Sheets

LENS BARREL

PRIORITY CLAIM

The present application is based on and claims priority from Japanese Application Number 2006-255363, filed Sep. 21, 2006, the disclosure of which is hereby incorporated by reference herein in its entirety.

BACKGROUND OF THE INVENTION

1. Field of the Invention

The present invention relates to measures against light leakage in a telescopic lens barrel which is used for an imaging optical system, which retracts a lens group in a pattern and which extends the lens groups to a predetermined position in a usage pattern. More particularly, the invention relates to a lens barrel suitable for a zoom lens which relatively moves a plurality of lens groups to change a focal length.

2. Description of Related Art

In image pickup apparatuses such as digital cameras, as performance of image pickup lenses such as zoom lenses whose focal length can be changed is enhanced and in keeping with the trend towards downsizing as desired by users, so-called telescopic image pickup lenses having a lens barrel which is accommodated in an image pickup apparatus main body when the image pickup apparatus is not used for image pickup are increasing.

Users desire reduction not only in size but also in thickness. With this, it is important to reduce the thickness of the lens barrel in its retracted state as thin as possible.

A technique for satisfying the requirement of reduction of the image pickup apparatus in thickness include the telescopic structure in which the lens barrel is accommodated in the image pickup apparatus when the image pickup apparatus is not used for shooting. In the telescopic lens barrel of this kind, however, a distance between a plurality of lens holding frames which respectively hold the plurality of lens groups is shortened, thereby leading to interference between the lens holding frames and another member.

To resolve the interference, a notch or hole is formed in a portion of the lens holding frame which interferes with another member, thereby to form an opening, i.e., a through hole through which the lens holding frame pass.

As a result, light does not pass through the original optical path formed by the lens and a harmful light passing through the through hole of the lens holding frame, so that image deterioration such as flare is generated by the harmful light.

Techniques for resolving the harmful light passing through the through hole of such a lens holding frame are disclosed in Japanese Patent Applications Laid-open (JP-A) Nos. 2006-79070 and 2005-308843, and Japanese Utility Model Registration No. 2565022.

JP-A-2006-79070 describes a constitution in which an elastically deformable light shielding elastic tongue piece is fixed to a lens holding frame, and the light shielding elastic tongue piece comes into contact with an inner peripheral surface of an outer peripheral barrel, thereby shading the through hole portion.

JP-A-2005-308843 describes the following constitution. A wall of a lens holding frame having a notch is provided with a light shielding piece such that the light shielding piece can rock around an axis which is substantially in parallel to a plane intersecting with an optical axis perpendicularly. The light shielding piece is retracted substantially in parallel to the optical axis by a projection of the other lens holding frame in its retracted state. In the shooting state, the light shielding piece is returned to the light shielding state which is substantially in parallel to a plane intersecting with the optical axis perpendicularly by a biasing member.

Japanese Utility Model Registration No. 2565022 describes a constitution in which a light shielding member made of thin film light shielding sheet is provided, the light shielding member being formed at its outer peripheral edge with a large number of notches in the radial direction, thereby shading a gap of a slide fitting portion.

However, the constitution described in JP-A-2006-79070 has a problem in durability because the elastically deformable portion is pushed and bent. Further, it becomes a resistance against a relative movement between the lens holding frame and an outer peripheral barrel, which affects a driving force of the lens barrel.

According to the constitution described in JP-A-2005-308843, the light shielding piece is retracted substantially in parallel to the optical axis in the retracted state. Therefore, a size of the light shielding piece affects a size of the lens barrel in its retracted state, and for example, its thickness is increased.

If the constitution described in Japanese Utility Model Registration No. 2565022 is employed for the lens barrel of the present invention, a load is always applied to the light shielding sheet when the lens barrel is in its retracted state, and if the retracted state is maintained for a long time, the light shielding sheet is plastically deformed, which damages the light shielding in the shooting state.

SUMMARY OF THE INVENTION

The present invention has been accomplished in view of the above circumstances, and it is an object of the invention to provide a lens barrel capable of effectively shielding light in the shooting state and capable of obtaining excellent images without increasing the thickness of the lens barrel in its retracted state.

In order to achieve the above object, a lens barrel according to one embodiment of the invention includes: a stationary frame; a movable frame which includes a plurality of lens holding frames for respectively holding a plurality of lens groups, and which is supported by the stationary frame such that the movable frame is movable between a retracted state where at least one or more of the plurality of lens groups are retracted into the stationary frame and a shooting state where the lens group is moved toward an object of shooting; a lens holding frame driving apparatus which is provided on the stationary frame to drive the movable frame including the lens holding frame; a through hole formed in at least one of the plurality of lens holding frames; and a light shielding piece which is provided on the lens holding frame such that the light shielding piece is movable between a light shielding state where the light shielding piece rotates on a plane which is perpendicular to the optical axis to close the through hole and an opened state where the through hole is not blocked.

A lens barrel according to another embodiment of the invention includes: a stationary frame; a movable frame which includes a plurality of lens holding frames for respectively holding a plurality of lens groups, and which is supported by the stationary frame such that the movable frame is movable between a retracted state where at least one or more of the plurality of lens groups are retracted into the stationary frame and a shooting state where the lens group is moved toward an object of shooting; a lens holding frame driving apparatus which is provided on the stationary frame to drive the movable frame including the lens holding frame; a through hole formed in at least one of the plurality of lens holding frames; and a light shielding member made of polyester-based polyurethane foam which is pasted on at least a portion of an inner peripheral wall of the through hole to close the through hole.

A lens barrel according to still another embodiment of the invention includes: a stationary frame; a movable frame which includes a plurality of lens holding frames for respectively holding a plurality of lens groups, and which is supported by the stationary frame such that the movable frame is movable between a retracted state where at least one or more of the plurality of lens groups are retracted into the stationary frame and a shooting state where the lens group is moved toward an object of shooting; a lens holding frame driving apparatus which is provided on the stationary frame to drive the movable frame including the lens holding frame; a through hole formed in at least one of the plurality of lens holding frames; and a light shielding member comprising a light-shielding sheet which is pasted on at least a portion of an inner peripheral wall of the through hole to close the through hole.

DETAILED DESCRIPTION OF THE PREFERRED EMBODIMENTS

Figure 1:
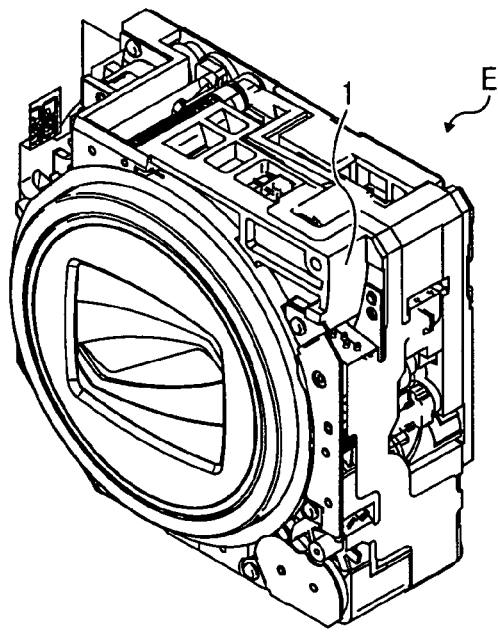
FIG. 1 is an explanatory view of a structure of a lens barrel according to a first embodiment of the present invention, and is a schematic perspective view of an outward appearance of an essential portion of the lens barrel in its retracted state in which lens groups are retracted and accommodated in a stationary frame side.

A lens barrel of the present invention will be explained in detail based on embodiments of the invention with reference to the drawings.

A lens barrel D according to a first embodiment is applied to a digital camera E as an image pickup apparatus. The lens barrel D includes a stationary frame 1, a rotation cylinder 2, a first retreating lens holding frame 11, a first retreating lens moving member 12, a first retreating lens group (third lens group) 13, a first main shaft 15, a second retreating lens holding frame 21, a second retreating lens moving member 22, a second retreating lens group (fourth lens group) 23, a second main shaft 25, a first auxiliary shaft 31, a second auxiliary shaft 32, a board 65, a first lens holding frame 101, a cam cylinder 102, a straight ahead guide 103, a rotation cylinder 104, a second lens holding frame 105, a shutter unit 106, a straight ahead guide 107, light shielding pieces 121 and 221, spindles 122 and 222 and biasing members 123 and 223.

Figure 2:
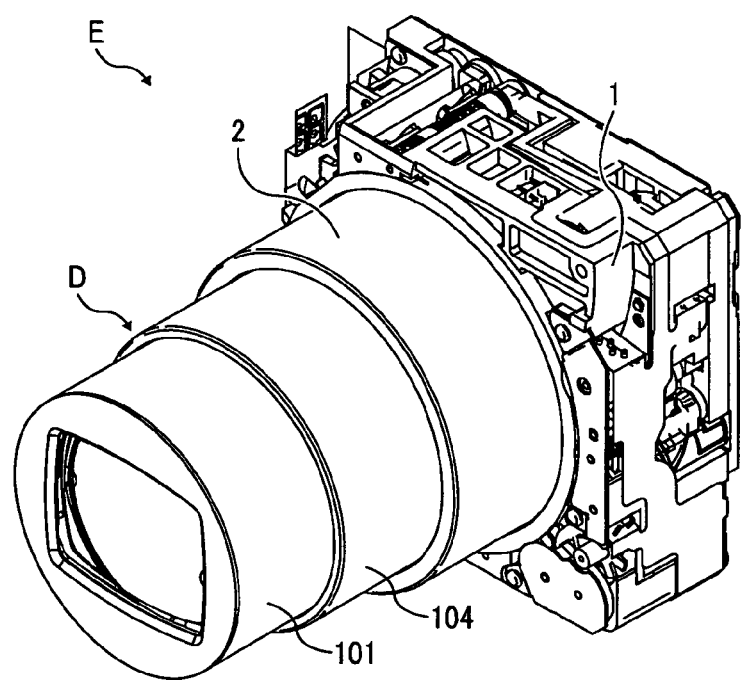
FIG. 2 is an explanatory view of a structure of the lens barrel of the first embodiment, and is a schematic perspective view of an outward appearance of an essential portion of a shooting state in which the lens groups are projected from the stationary frame for shooting.

As shown in FIGS. 1 and 2, the lens barrel D includes, as a base, the rectangular block-like stationary frame 1 of plastic molded article, for example.

Figure 5:
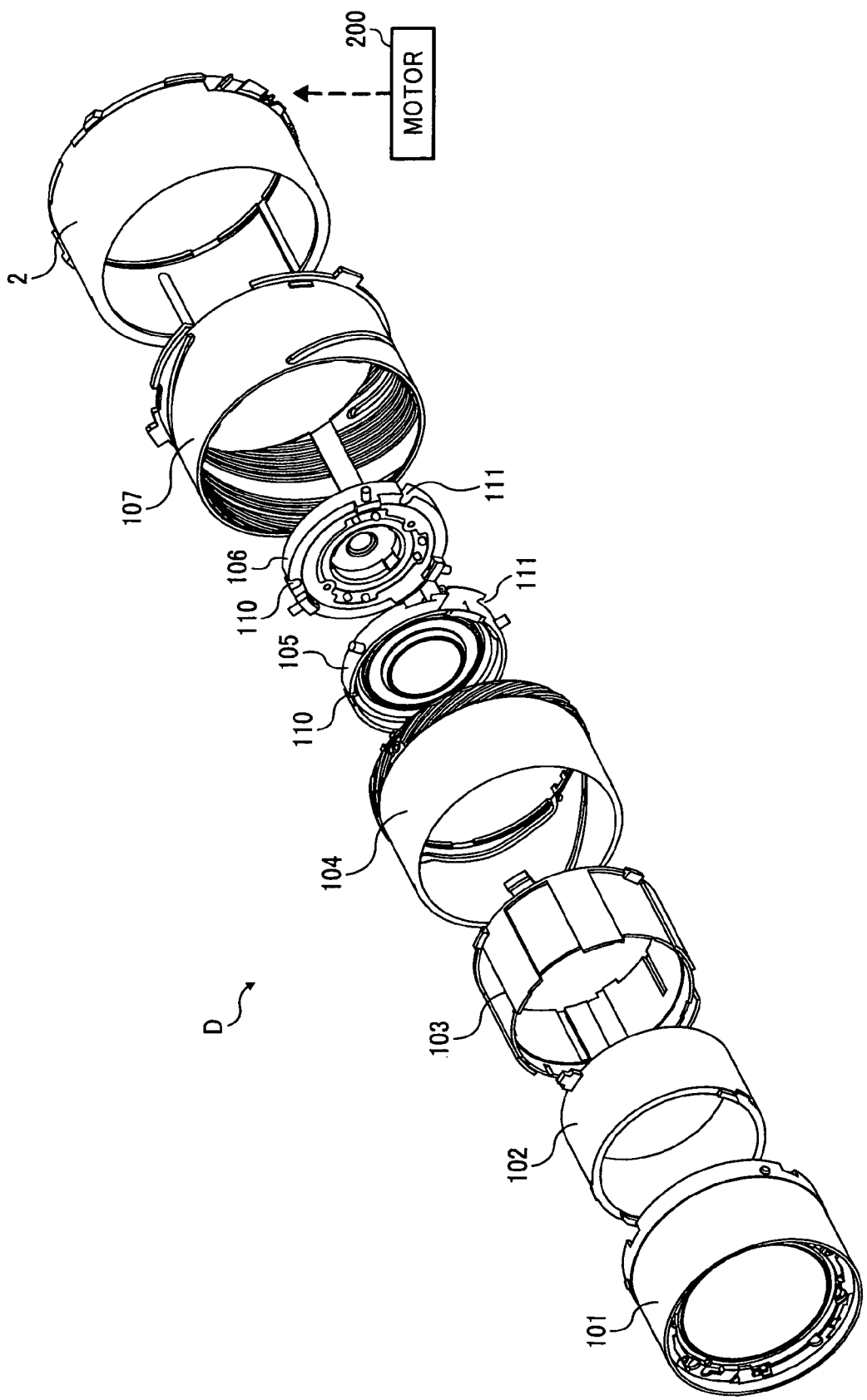
FIG. 5 is an explanatory view of the structure of the lens barrel of the first embodiment, and is an exploded perspective view of a movable frame including a lens holding frame of lens groups other than the retreating lens groups.

As shown in FIG. 5, the lens barrel D includes the first lens holding frame 101 and the second lens holding frame 105 as movable frames for holding lens groups. The lens barrel D also includes the rotation cylinder 2, the cam cylinder 102, the straight ahead guide 103, the rotation cylinder 104, the shutter unit 106, the straight ahead guide 107 which are substantially coaxially arranged.

The lens barrel D of the first embodiment includes four lens groups in total. The first lens holding frame 101 holds a first lens group (not shown) from an object of shooting, and the second lens holding frame 105 holds a second lens group (not shown) from the object of shooting.

Both the stationary frame 1 and the rotation cylinder 2 are formed with helicoids, and the helicoids are engaged with each other. The rotation cylinder 2 is rotated around its rotation axis with respect to the stationary frame 1, thereby forwardly and backwardly moving the rotation cylinder 2 along the rotation axis between a retracted position where lenses are retracted into the stationary frame 1 shown in FIG. 1 and a projecting position where the lenses project from the stationary frame 1 shown in FIG. 2.

The rotation cylinder 2 is rotated by a motor 200 shown in FIG. 5 which is included in lens holding frame driving means. The first lens holding frame 101, the cam cylinder 102, the straight ahead guide 103, the rotation cylinder 104, the second lens holding frame 105, the shutter unit 106 and the straight ahead guide 107 are appropriately engaged with each other inside of the inner periphery of the rotation cylinder 2 in a telescopic manner.

Therefore, as the rotation cylinder 2 rotates, the lens barrel D forwardly and backwardly moves in the telescopic manner, and the shape of the lens barrel D can be changed into the shooting state where the lens barrel D projects from the stationary frame 1 as shown in FIG. 2 and the retracted state where the lens barrel D retracts into the stationary frame 1 as shown in FIG. 1. Since a mechanism which forwardly and backwardly moves the lens barrel D has nothing to do with the subject matter of the present invention, a concrete structure thereof is not illustrated in the drawing.

Figure 3:
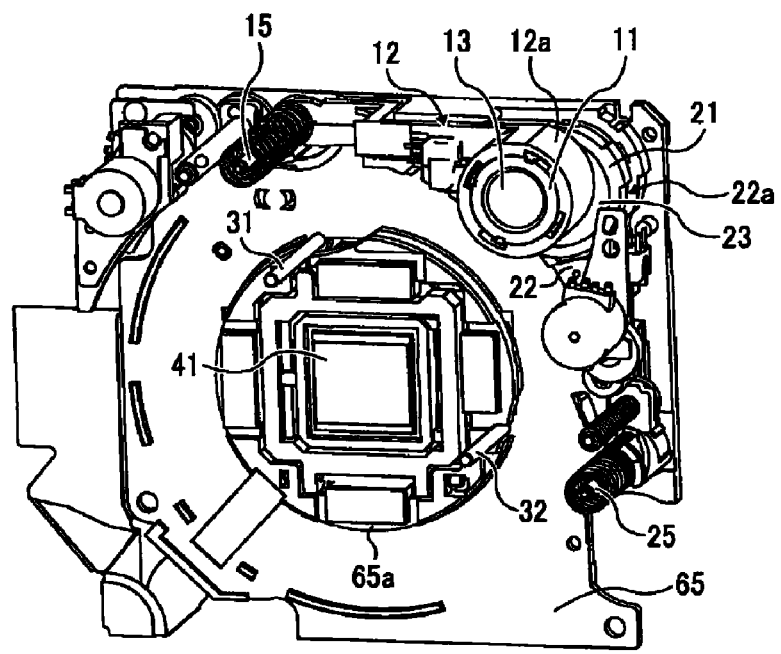
FIG. 3 shows an internal structure of the lens barrel of the first embodiment, and is a schematic perspective view of a retracted state of retreating lens groups of the plurality of lens groups which are designed to retreat from an optical axis.
Figure 4:
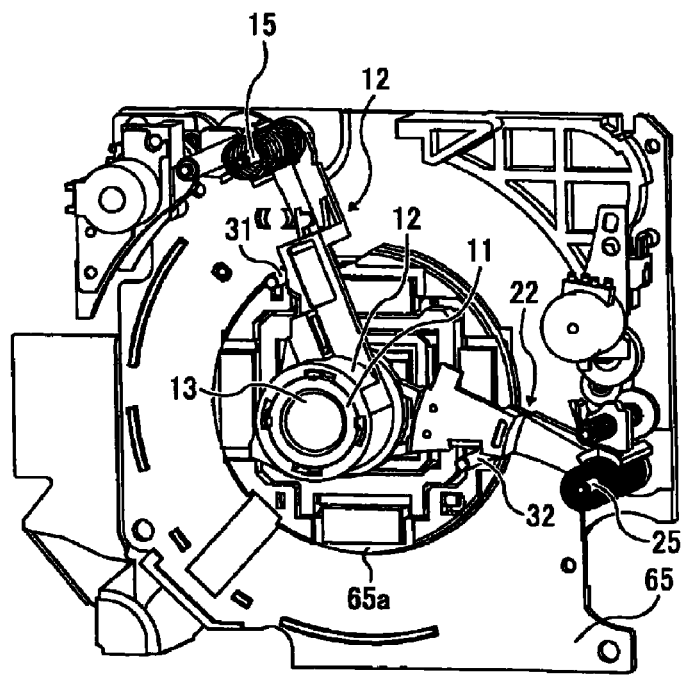
FIG. 4 shows an internal structure of the lens barrel of the first embodiment, and is a schematic perspective view of a state where retreating lens groups of the plurality of lens groups which are designed to retreat from the optical axis extend onto the optical axis.

The board 65 having a circular hole 65a formed at its central portion is integrally provided on the stationary frame 1 on the base end side thereof as shown in FIGS. 3 and 4. Forwardly and backwardly moving mechanisms for the lens groups 13 and 23, as described later, are formed on the board 65.

That is, FIG. 3 shows a state in which the first retreating lens group 13 and the second retreating lens group 23 configured such that they retract from the optical axis of the lens barrel D retract from the optical axis when lens groups retract. FIG. 4 shows a state where the first retreating lens group 13 and the second retreating lens group 23 of the lens barrel D extend onto the optical axis at the time of shooting.

Around a left upper edge portion of the board 65 in FIGS. 3 and 4, the first main shaft 15 is integrally fixed to the board 65, and the first retreating lens moving member 12 is mounted so as to be rotatable around the first main shaft 15 on a plane which is in parallel to the plane of the board 65.

The first retreating lens moving member 12 has a cylindrical tip end 12a, and the first retreating lens holding frame 11 holding the first retreating lens group 13 is fitted into the cylindrical tip end 12a.

The first retreating lens group 13 constitutes a third lens group as counted from the object of shooting.

The first retreating lens moving member 12 is turned around the first main shaft 15 thereby to be movable between the retracted state which extends substantially along an upper edge of the board 65 as shown in FIG. 3 and the extending state where the optical axis position of the first retreating lens group 13 substantially matches with the center of the hole 65a of the board 65 shown in FIG. 4. As the first retreating lens moving member 12 turns, it can move forward and backward along the first main shaft 15.

The positioning of the extending state of the first retreating lens moving member 12 shown in FIG. 4 is carried out by abutting the first retreating lens moving member 12 against the first auxiliary shaft 31 which integrally stands on the board 65 substantially in parallel to the optical axis.

The second main shaft 25 is integrally fixed to a lower right edge portion of the board 65 in FIGS. 3 and 4, and the second retreating lens moving member 22 is mounted so as to be rotatable around the second main shaft 25 in a plane parallel to a plane of the board 65.

The second retreating lens moving member 22 has a cylindrical tip end 22a. The second retreating lens holding frame 21 holding the second retreating lens group 23 is fitted into the cylindrical tip end 22a.

The second retreating lens group 23 constitutes a fourth lens group as counted from the object of shooting.

The second retreating lens moving member 22 turns around the second main shaft 25 thereby to be movable between the retracted state extending along the right edge of the board 65 shown in FIG. 3 and the extending state where the position of the optical axis of the second retreating lens group 23 substantially matches with the center of the center hole of the board 65 shown in FIG. 4. As the second retreating lens moving member 22 turns, it can move forward and backward along the second main shaft 25.

The positioning of the extending state of the second retreating lens moving member 22 shown in FIG. 4 is carried out by abutting the second retreating lens moving member 22 against the second auxiliary shaft 32 which stands on the board 65 substantially in parallel to the optical axis.

Figure 6:
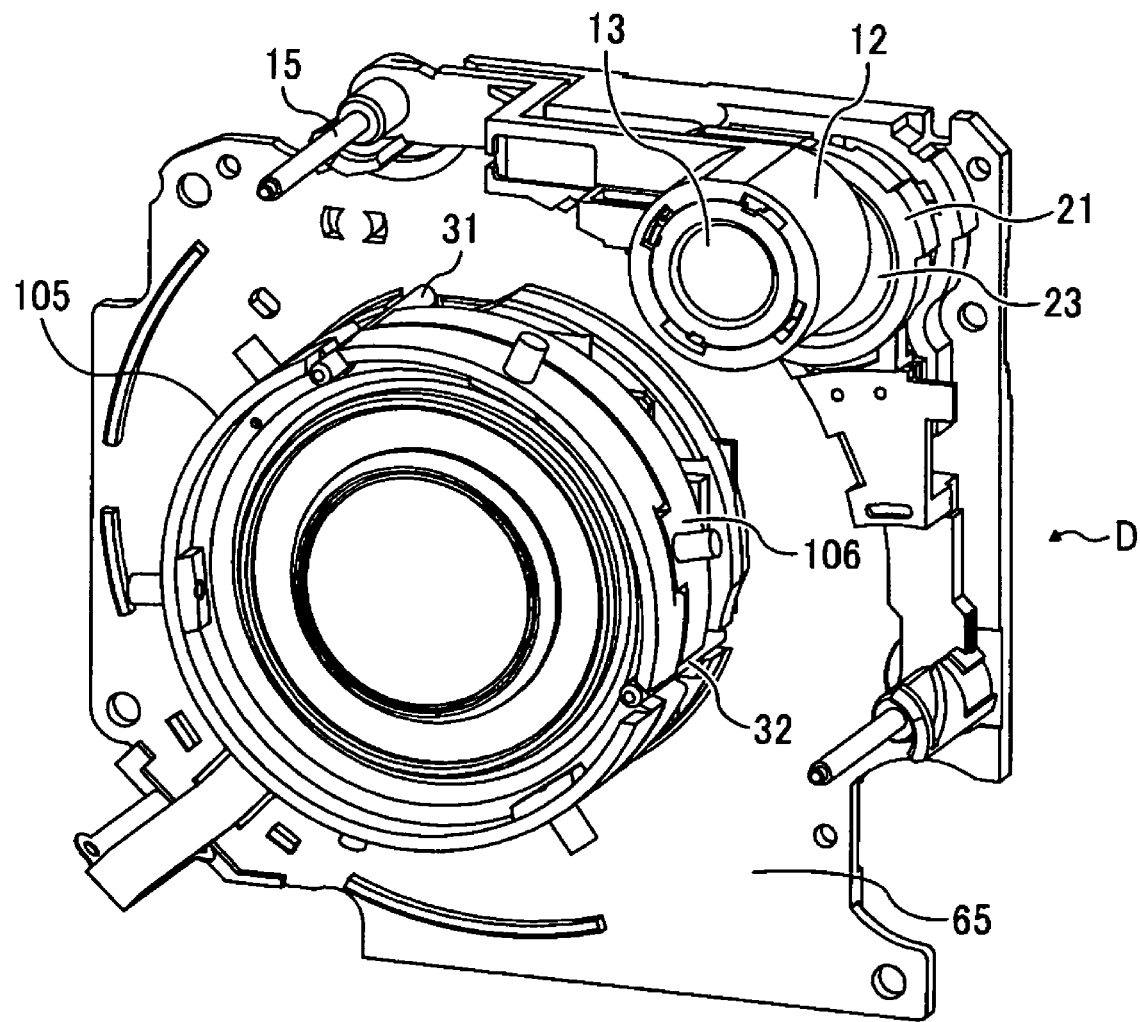
FIG. 6 is an explanatory view of the structure of the lens barrel of the first embodiment, and is a schematic perspective view of a state where an auxiliary shaft passes through a through hole of the lens holding frame.

When the lens barrel D of the first embodiment is in the retracted state, the second lens holding frame 105 and the shutter unit 106 approach the board 65 as shown in FIG. 6. The second lens holding frame 105 and the shutter unit 106 have formed therein a through hole 110 for avoiding interference with the first auxiliary shaft 31 and a through hole 111 for avoiding interference with the second auxiliary shaft 32, respectively. As shown in FIG. 8, the through holes 110 and 111 are formed into U-shaped grooves.

Therefore, when the lens barrel is retracted as shown in FIG. 6, the first auxiliary shaft 31 and the second auxiliary shaft 32 pass through the through holes 110 and 111 of the second lens holding frame 105 and the shutter unit 106.

In the shooting state, however, since the second lens holding frame 105 and the shutter unit 106 extend toward the object of shooting with respect to the board 65, the through holes 110 and 111 may cause the light leakage.

Hence, the lens barrel D of the first embodiment is provided with the light shielding piece 121 and the light shielding piece 221 for light-shielding the through holes 110 and 111.

FIGS. 7A, 7B, 8A and 8B show the light shielding piece 121 and 221 provided on the second lens holding frame 105.

Figure 7A:
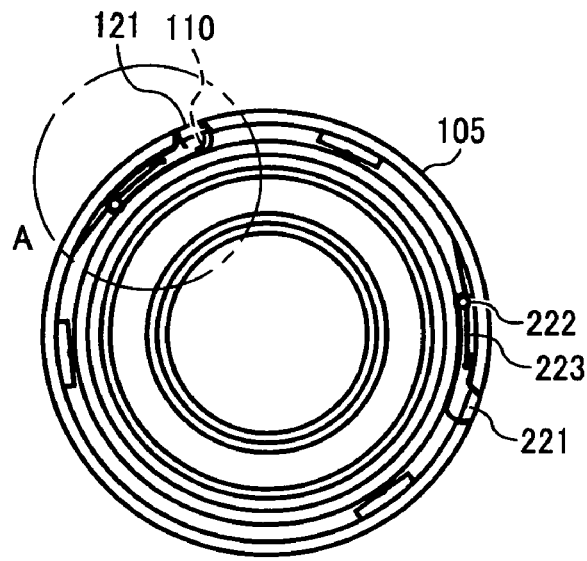
FIG. 7A shows an operating status of a light shielding state of the light shielding piece of the lens barrel according to the first embodiment (shooting state of the lens barrel), and is a front view of a second lens holding frame as viewed from an object of shooting.
Figure 7B:
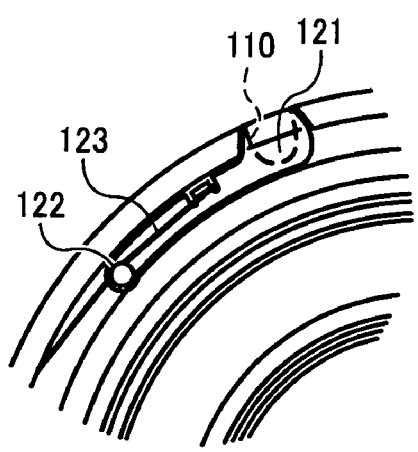
FIG. 7B is an enlarged detailed view of a part A in FIG. 7B.

FIGS. 7A and 7B show a light shielding state in which the light shielding pieces 121 and 221 close the through holes 110 and 111 formed in the second lens holding frame 105 in the shooting state of the lens barrel D. The light shielding piece 121 is supported by the second lens holding frame 105 through the spindle 122 such that the light shielding piece 121 can turn on a plane which is perpendicular to the optical axis at right angles, and the light shielding piece 121 is biased by a biasing member 123 such as a torsion spring in a direction closing the through hole 110.

Figure 8A:
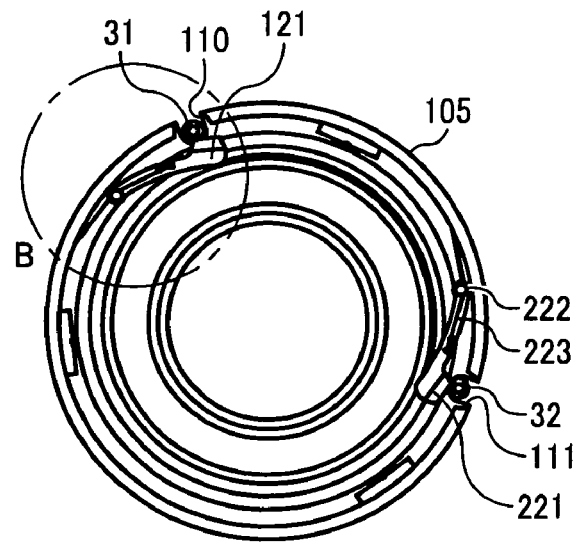
FIG. 8A shows an operation status of an opened state of the light shielding piece in the lens barrel of the first embodiment (retracted state of the lens barrel), and is a front view of the second lens holding frame as viewed from the object of shooting.
Figure 8B:
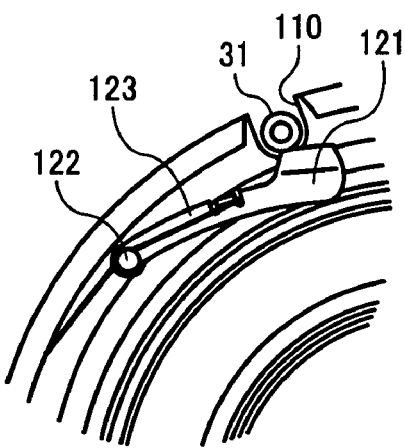
FIG. 8B is an enlarged detailed view of a part B in FIG. 8A.

FIGS. 8A and 8B show the opened state where the light shielding pieces 121 and 221 do not close the through holes 110 and 111. In the retracted state of the lens barrel D, the first auxiliary shaft 31 passes through the through hole 110 formed in the second lens holding frame 105. If the light shielding piece 121 is pushed away by the first auxiliary shaft 31, the first auxiliary shaft 31 rotates and moves against a biasing force caused by the biasing member 123 on the plane which is perpendicular to the optical axis. Thereafter, if the lens barrel D returns to the shooting state, the light shielding piece 121 returns to the light shielding state shown in FIGS. 7A and 7B by the biasing force of the biasing member 123.

Similarly, in FIGS. 7A and 7B, the light shielding piece 221 in its light shielding state closes the through hole 111 formed in the second lens holding frame 105. The light shielding piece 221 is rotatably supported by the second lens holding frame 105 through the spindle 222, and is biased by the biasing member 223 such as a torsion spring in a direction closing the through hole 111.

In FIGS. 8A and 8B, in the retracted state of the lens barrel D, the second auxiliary shaft 32 passes through the through hole 111 formed in the second lens holding frame 105. If the light shielding piece 221 is pushed away by the second auxiliary shaft 32, it rotates and moves against a biasing force caused by the biasing member 223 on a plane which is perpendicular to the optical axis. Thereafter, if the lens barrel D returns to the shooting state, the light shielding piece 221 returns to the state shown in FIG. 7 by the biasing force of the biasing member 223.

Figure 9:
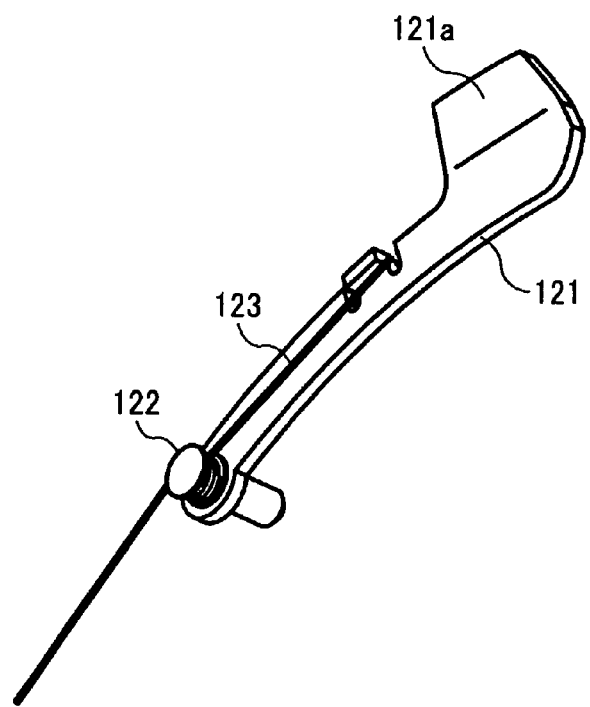
FIG. 9 is an explanatory view of a structure of the lens barrel of the first embodiment, and is an enlarged schematic detailed perspective view of the light shielding piece.

FIG. 9 shows details of the light shielding piece 121. The light shielding piece 121 is made of, for example, metal, its base end is rotatably supported by the spindle 122, an end thereof in the biasing force of the tip end (counterclockwise direction in FIG. 9) is bent and inclined toward the object of shooting to thereby form an oblique portion 121a.

Therefore, when a tip end of the first auxiliary shaft 31 abuts against and presses a back surface of the oblique portion 121a as viewed in the drawing, a component force is generated in a direction perpendicular to the optical axis, and the light shielding piece 121 rotates and moves around the spindle 122. The back surface of the oblique portion 121a is subjected to the sliding processing by TUFFTRIDE® and thus, its durability is excellent. A front surface of the light shielding piece 121 as viewed in the drawing is subjected to the antireflective processing, and an image is not damaged by the reflection in this portion. The light shielding piece 221 also has the same structure.

Figure 10A:
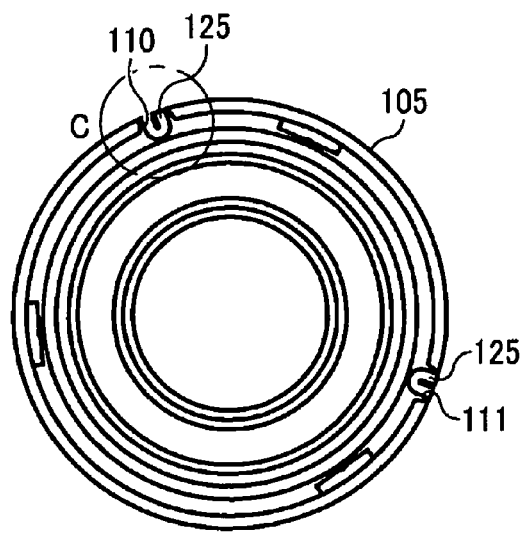
FIG. 10A is an explanatory view of a structure of a lens barrel according to a second embodiment of the invention, and is a front view showing an operating status of a light shielding state (shooting state of the lens barrel) of a light shielding member as viewed from an object of shooting of a second lens holding frame.
Figure 10B:
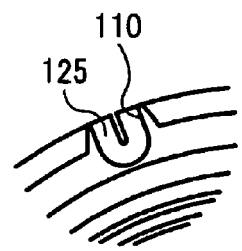
FIG. 10B is an enlarged detailed view of a part C in FIG. 10A.

FIGS. 10A and 10B show a light shielding state of a light shielding member 125 when a lens barrel of a second embodiment of the present invention is brought into the shooting state. FIG. 10A shows a second lens holding frame 105 as viewed from the object of shooting, and FIG. 10B is an enlarged view of a portion C in FIG. 10A. As shown in FIG. 10A, the light shielding member 125 made of a light-shielding sheet or polyester-based polyurethane foam (e.g., Moltoprene®) is pasted on inner peripheral wall surfaces of the substantially U-shaped groove like through holes 110 and 111 of the second lens holding frame 105 such that its cross section is formed into U-shape.

In this manner, the soft light shielding member 125 such as the light-shielding sheet or moltoprene is pasted on the inner peripheral wall surfaces of the through holes 110 and 111 of the second lens holding frame 105. This makes it possible to insert the first auxiliary shaft 31 through the through holes 110 and 111 in the retracted state, and also allows the light shielding member 125 to light-shield the through holes 110 and 111 in the shooting state.

The light shielding member 125 may be arranged in any manner as long as it is pasted on at least portions of the inner peripheral walls of the through holes 110 and 111 such that the through holes 110 and 111 are substantially closed in the shooting state of the lens barrel and the first auxiliary shaft 31 can be inserted through the through holes 110 and 111 in the retracted state of the lens barrel.

The lens barrel D of the first embodiment and the lens barrel of the second embodiment may be included as an imaging optical system of an image pickup apparatus such as various cameras. This constitution enables to block harmful light which is reflected on a portion other than the original optical path formed by an optical system or which passes through a portion other than the original optical path, and also enables the image pickup apparatus to obtain excellent images. An image pickup apparatus including such a lens barrel as an imaging optical system is suitable for a digital camera.

Thus, the lens barrel D of the first embodiment has the following features.

The lens barrel D of the first embodiment includes the light shielding pieces 121 and 221 which rotate on the plane perpendicular to the optical axis on the second lens holding frame 105 as structures which close the through holes 110 and 111 of the second lens holding frame 105. Therefore, the thickness of the lens barrel in the retracted state is not increased and light is shielded in the shooting state to thereby obtain excellent images.

According to the lens barrel D of the first embodiment, in the retracted state, the first auxiliary shaft 31 and the second auxiliary shaft 32 for positioning the first retreating lens holding frame 11 and the second retreating lens holding frame 21 on the optical axis are inserted through the through holes 110 and 111 of the second lens holding frame 105, so that lengths of the first auxiliary shaft 31 and the second auxiliary shaft 32 in the direction of the optical axis can be secured. This constitution can increase the turning amounts of the first retreating lens moving member 12 and the second retreating lens moving member 22 which move both the retreating lens holding frames 11 and 21. Consequently, the moving distances of the retreating lens holding frames 11 and 21 in the direction of the optical axis can be increased, thereby enhancing zoom magnification and focus performance.

Further, according to the lens barrel D of the first embodiment, the light shielding pieces 121 and 221 are moved utilizing a driving force caused when the lens barrel D is shifted from the shooting state to the retracted state. Accordingly, the lens barrel D can be made compact and the thickness of the lens barrel D in the retracted state can be reduced as compared with a case where a special driving source of the light shielding pieces 121 and 221 is provided.

More specifically, according to the lens barrel D of the first embodiment, the light shielding pieces 121 and 221 are shifted between the light shielding state and the opened state utilizing the relative movement between the first auxiliary shaft 31 and the second auxiliary shaft 32 when the lens barrel D is shifted from the shooting state to the retracted state. With this, the thickness of the lens barrel D in the retracted state can be reduced as compared with a case in which there is provided a special driving mechanism only for rotating and moving the light shielding pieces 121 and 221.

Further, according to the lens barrel D of the first embodiment, the first auxiliary shaft 31, the second auxiliary shaft 32 and the light shielding pieces 121 and 221 come into contact with each other in the retracted state to thereby generate component forces. The light shielding pieces 121 and 221 are rotated and moved by the component forces from the light shielding state to the opened state. Therefore, as compared with a case in which the movements of the first auxiliary shaft 31 and the second auxiliary shaft 32 are indirectly transmitted to the light shielding pieces 121 and 221, the lens barrel D can be made compact, and the thickness of the lens barrel in the retracted state can be reduced.

In the lens barrel D of the first embodiment, since the spindles 122 and 222 of the light shielding pieces 121 and 221 are the metal pins, the durability is excellent. Thus, as compared with a case where the spindles 122 and 222 are inferior in durability, the thickness of the lens barrel D in the retracted state can be reduced.

In the lens barrel D of the first embodiment, the light shielding pieces 121 and 221 are made of metal or resin, and portions thereof which abut against the first auxiliary shaft 31 and second auxiliary shaft 32 are subjected to the sliding processing. As compared with a case in which the light shielding pieces 121 and 221 are not subjected to the sliding processing, the light shielding pieces 121 and 221 can move smoothly, the durability is more excellent, and the thickness of the lens barrel in the retracted state can be reduced.

In the lens barrel D of the first embodiment, surfaces of the light shielding pieces 121 and 221 on the side of the object of shooting are subjected to the antireflective processing. With this, light having passed through each lens group in the shooting state is not reflected by the light shielding pieces 121 and 221 and thus, it is possible to prevent harmful light from being generated, with the result that excellent image quality can be obtained.

According to the lens barrel of the second embodiment, the light shielding member 125 made of a light-shielding sheet or moltoprene is pasted on at least portions of the inner peripheral walls of the through holes 110 and 111 of the second lens holding frame 105 such as to draw a U-shape, for example. With this, durability is enhanced and excellent images can be obtained.

According to the second embodiment, like the first embodiment, the first auxiliary shaft 31 and second auxiliary shaft 32 are inserted through the through holes 110 and 111 of the second lens holding frame 105, and thus, it is possible to secure the lengths of the first auxiliary shaft 31 and second auxiliary shaft 32 in the direction of the optical axis. This constitution can increase the turning amounts of the first retreating lens moving member 12 and the second retreating lens moving member 22 which move the retreating lens holding frames 11 and 21. This allows the moving distances of the lens holding frames 11 and 21 to increase in the direction of the optical axis to thereby enhance zoom magnification and focus performance. As compared with a case in which as the lens barrel D is shifted from the shooting state to the retracted state, the light shielding member 125 is provided with a driving source only for the light shielding pieces 121 and 221, it is possible to make the lens barrel D compact and also to reduce the thickness of the lens barrel D in the retracted state.

According to the lens barrel of another embodiment of the invention, the light shielding piece is rotated and moved from the light shielding state to the opened state by a relative movement between the lens holding frame provided with the light shielding piece when shifted from the shooting state to the retracted state and the movable frame including the other lens holding frame. More specifically, a projection formed on the movable frame and a portion of the light shielding piece abut against each other and the light shielding piece is pressed by the projection, so that the light shielding piece can be rotated and moved. Accordingly, as compared with a case where a driving mechanism only for moving the light shielding piece is provided, the thickness of the lens barrel in the retracted state can be reduced.

According to the lens barrel of another embodiment of the invention, the light shielding piece is rotated and moved from the light shielding state to the opened state by a driving mechanism which is driven by lens holding frame driving means when shifted from the shooting state to the retracted state. More specifically, a driving force of the motor 200 or a motion of the movable frame which is moved by the motor 200 is transmitted to the light shielding piece through a driving mechanism such as a belt or a gear, thereby rotating and moving the light shielding piece. Therefore, it is possible to reduce the thickness of the lens barrel in the retracted state as compared with a case where a driving mechanism only for moving the light shielding piece is provided.

Although the embodiments of the present invention have been described above, the invention is not limited to the embodiments.

For example, although the lens barrel is used for the digital camera in the embodiments, the lens barrel of the invention can be applied to a video camera, a silver salt camera or an image pickup apparatus having a zoom barrel. It is possible to provide an image pickup apparatus in which the size of the lens barrel in the direction of the optical axis can be reduced, and harmful light can be blocked to thereby obtain excellent images.

In the embodiments, a torsion spring is used as the biasing member 123 which biases the light shielding pieces 121 and 221 toward the light shielding state, but other members such as rubber or resin biasing member and a damper using fluid pressure may be used as the biasing member.

In the embodiment, the lens barrel has the four lens groups, but the number of lens groups is not limited to four as long as the number is two or more. Similarly, two retreating lens moving members are used in the embodiment, but the number of retreating lens moving members is not limited to two as long as the number is one or more.

Although the first auxiliary shaft 31 and second auxiliary shaft 32 are inserted through the through holes 110 and 111 in the embodiment, members which are inserted through the through holes 110 and 111 are not limited to the first auxiliary shaft 31 and second auxiliary shaft 32. Other members may be used as long as the member comes in and out for avoiding interference as the lens barrel is displaced between the shooting state and the retracted state.

Although the present invention has been described in terms of exemplary embodiments, it is not limited thereto. It should be appreciated that variations may be made in the embodiments described by persons skilled in the art without departing from the scope of the present invention as defined by the following claims.

What is claimed is:

1. A lens barrel comprising:
   a stationary frame;
   a movable frame which includes a plurality of lens holding frames for respectively holding a plurality of lens groups, and which is supported by the stationary frame such that the movable frame is movable along an optical axis of the lens groups between a retracted state where at least one part of the plurality of lens groups is retracted into the stationary frame and a shooting state where the lens groups are moved toward an object of shooting;
   a through hole formed in at least one of the plurality of lens holding frames;
   a retreating lens holding frame which is included in at least one of the plurality of lens holding frames, and which turns and retracts the held lens group on an outer side from an inner diameter of the movable frame in the retracted state;
   a light shielding piece which is provided on at least one of the lens holding frames such that the light shielding piece is movable between a light shielding state where the light shielding piece rotates on a plane which is perpendicular to the optical axis to close the through hole and an opened state where the through hole is not blocked; and
   a shaft which is arranged substantially parallel to the optical axis of the lens groups and provided on the stationary frame, the shaft positioning the retreating lens holding frame in a rotation direction at a position where a center of the lens group held by the retreating lens holding frame and an optical axis of the movable frame match with each other, wherein the shaft is inserted in the through hole in the retracted state, the shaft being engageable with the light shielding piece, and wherein an engaging portion is provided between the shaft and the light shielding piece, the engaging portion being configured to generate a component force to move the light shielding piece from the light shielding state to the opened state in a direction perpendicular to the optical axis when the light shielding piece is engaged with the shaft while the lens groups are moved from the shooting state to the retracted state.

2. The lens barrel according to claim 1, wherein the engaging portion is provided on the light shielding piece, and the engaging portion of the light shielding piece includes an oblique portion contacting with a leading end of the shaft, wherein the light shielding piece is moved in a direction perpendicular to the optical axis in a state where the oblique portion is pressed by the leading end of the shaft.

3. The lens barrel according to claim 1, further comprising a biasing member configured to bias the light shielding piece toward the opened state.

4. The lens barrel according to claim 1, wherein the through hole is a groove provided in an outer edge of the movable frame.

5. A lens driving device used for the lens barrel recited in claim 1, wherein the lens driving device is configured to move at least one part of the plurality of lens groups between the retracted state where the one part is retracted into the stationary frame and the shooting state where the lone part is moved toward the object of shooting and retract at least one of the plurality of lens groups in an outer side from an inner diameter of the movable frame in the retracted state.

6. An imaging apparatus, comprising: the lens barrel as recited in claim 1.

7. A camera, comprising: the lens barrel as recited in claim 1.

8. A lens barrel comprising:
a stationary frame;
a movable frame which includes a plurality of lens holding frames for respectively holding a plurality of lens groups, and which is supported by the stationary frame such that the movable frame is movable along an optical axis of the lens groups between a retracted state where at least one part of the plurality of lens groups is retracted into the stationary frame and a shooting state where the lens groups are moved toward an object of shooting;
a lens holding frame driving apparatus which is provided on the stationary frame to drive the movable frame including the lens holding frames,
a through hole formed in at least one of the plurality of lens holding frames;
a retreating lens holding frame which is included in at least one of the plurality of lens holding frames, and which turns and retracts the held lens group on an outer side from an inner diameter of the movable frame in the retracted state;
a light shielding piece which is provided on at least one of the lens holding frames such that the light shielding piece is movable between a light shielding state where the light shielding piece rotates on a plane which is perpendicular to the optical axis to close the through hole and an opened state where the through hole is not blocked; and
a spindle configured to support the light shielding piece on at least one of the lens holding frames, wherein the spindle includes a metal pin.

9. The lens barrel according to claim 8, further comprising a shaft which is arranged substantially parallel to the optical axis of the lens groups and provided on the stationary frame, the shaft positioning the retreating lens holding frame in a rotation direction at a position where a center of the lens group held by the retreating lens holding frame and an optical axis of the movable frame match with each other, wherein the shaft is inserted in the through hole in the retracted state, the shaft being engageable with the light shielding piece, and wherein an engaging portion is provided between the shaft and the light shielding piece, the engaging portion being configured to generate a component force to move the light shielding piece from the light shielding state to the opened state in a direction perpendicular to the optical axis when the light shielding piece is engaged with the shaft while the lens groups are moved from the shooting state to the retracted state.

10. The lens barrel according to claim 9, wherein the engaging portion is provided on the light shielding piece, and a surface of the engaging portion engaging with the shaft is subjected to antireflective processing.

11. A lens barrel, comprising:
a stationary frame;
a movable frame which includes a plurality of lens holding frames for respectively holding a plurality of lens groups, and which is supported by the stationary frame such that the movable frame is movable along an optical axis of the lens groups between a retracted state where at least one part of the plurality of lens groups is retracted into the stationary frame and a shooting state where the lens groups are moved toward an object of shooting;
a through hole formed in at least one of the plurality of lens holding frames;
a retreating lens holding frame which is included in at least one of the plurality of lens holding frames, and which turns and retracts the held lens group on an outer side from an inner diameter of the movable frame in the retracted state;
a light shielding piece which is provided on at least one of the lens holding frames such that the light shielding piece is movable between a light shielding state where the light shielding piece rotates on a plane which is perpendicular to the optical axis to close the through hole and an opened state where the through hole is not blocked; and
an engaging portion provided between the movable frame and the light shielding piece,
wherein the engaging portion is configured to generate a component force to move the light shielding piece from the opened state to the light shielding state in a direction perpendicular to the optical axis when the light shielding piece is engaged with the movable frame while the lens groups are moved from the retracted state to the shooting state.

* * * * *